United States Patent [19]

Stevenson et al.

[11] Patent Number: 5,128,077
[45] Date of Patent: Jul. 7, 1992

[54] METHOD FOR PRODUCING MULTICOMPONENT EXTRUSIONS HAVING CONTROLLED COMPONENT CONTRIBUTIONS

[75] Inventors: James F. Stevenson, Hudson; Thomas E. Codispoti, Akron, both of Ohio

[73] Assignee: General Tire, Inc., Akron, Ohio

[21] Appl. No.: 654,260

[22] Filed: Feb. 12, 1991

[51] Int. Cl.$^5$ .................. B29C 47/06; B29C 47/92
[52] U.S. Cl. .................. 264/40.2; 264/40.4; 264/40.7; 264/177.1; 264/211.23; 364/473; 425/141
[58] Field of Search .............. 264/40.2, 40.4, 40.7, 264/40.5, 211.23, 177.1; 425/140, 141, 162, 172; 364/473

[56] References Cited

U.S. PATENT DOCUMENTS

| | | | |
|---|---|---|---|
| 3,150,213 | 9/1964 | Doering | 425/140 |
| 4,087,499 | 5/1978 | Bayonnet | 264/40.7 |
| 4,425,289 | 1/1984 | Lee et al. | 425/140 |
| 4,428,896 | 1/1984 | Stevenson | 264/40.4 |
| 4,514,812 | 4/1985 | Miller et al. | 425/141 |
| 4,515,738 | 5/1985 | Anders | 425/140 |
| 4,592,881 | 6/1986 | Kyriakis | 264/40.1 |
| 4,680,152 | 7/1987 | Capelle | 425/140 |
| 4,754,413 | 6/1988 | Koster et al. | 264/40.7 |
| 4,844,846 | 7/1989 | Peterson, Jr. et al. | 264/40.4 |

OTHER PUBLICATIONS

Analysis of extrudate dimensions: die design, swell, and drawdown, by James F. Stevenson (Jan. 4, 1985).

Primary Examiner—Jan H. Silbaugh
Assistant Examiner—Mathieu Vargot
Attorney, Agent, or Firm—Calfee, Halter & Griswold

[57] ABSTRACT

A method of producing a multicomponent extrudate in which the operating line automatically and accurately extrudes the extrudate materials necessary to obtain the desired contribution of materials and specified dimensions of the multicomponent extrudate profile. The screw speed of each extruder can be adjusted to the desired speed by determining the actual thickness and width dimensions of the multicomponent extrudate. The actual measurements are then fed to a computer which calculates the corresponding values of the ratios of the extruder screw speeds to line speed. using the specified dimensions desired in the extrudate, the corresponding values for the screw and line speeds are also calculated. A comparison of the speeds based on measured dimensions, with the speeds based on specified dimensions, provides a measurement by which the screw speeds may then be adjusted such that the measurements of the extrudate profile are brought closer to the specified dimensions of the multicomponent extrudate profile.

9 Claims, 2 Drawing Sheets

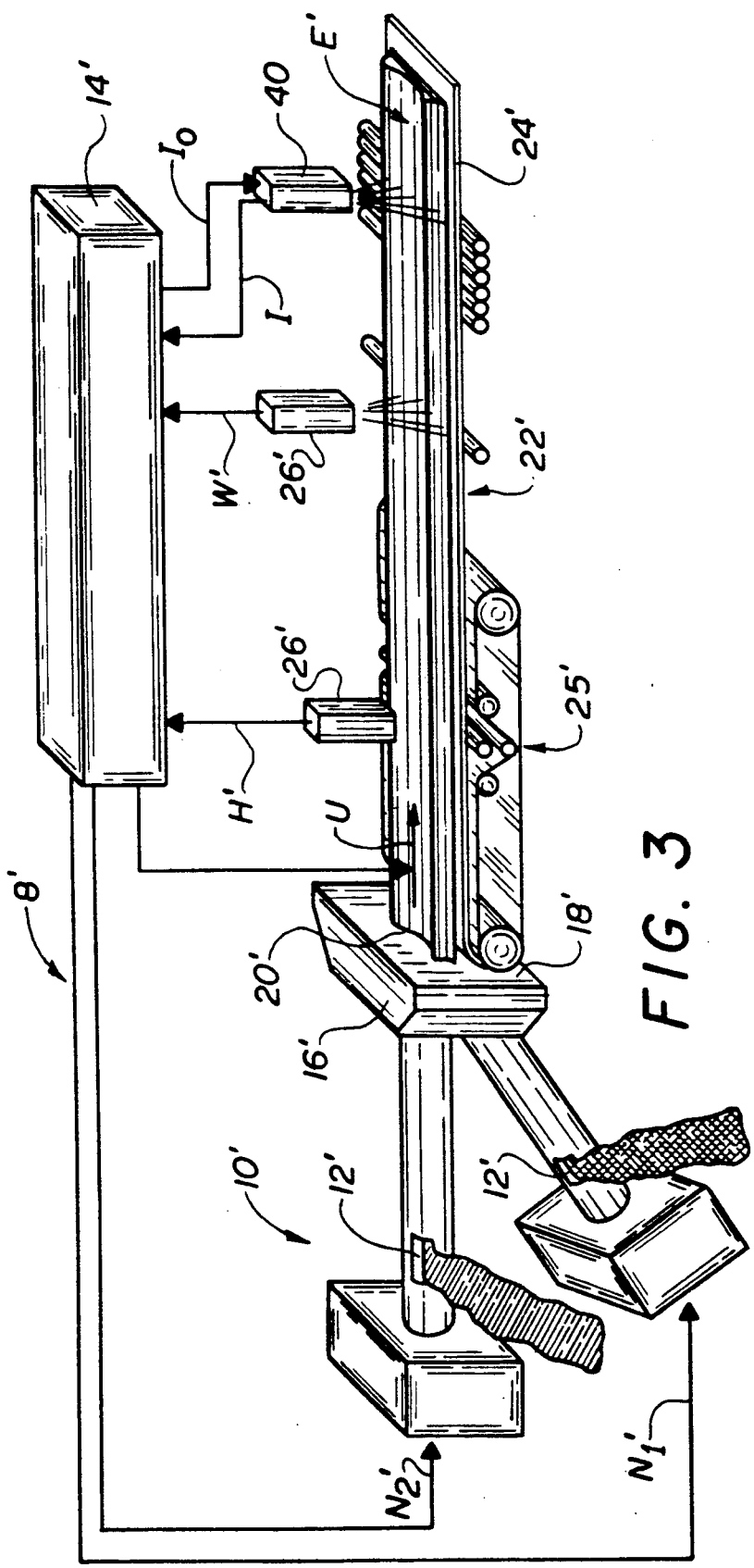
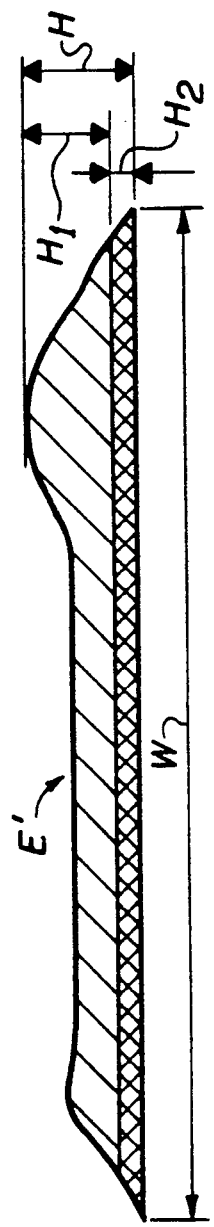
FIG. 3
FIG. 4

METHOD FOR PRODUCING MULTICOMPONENT EXTRUSIONS HAVING CONTROLLED COMPONENT CONTRIBUTIONS

TECHNICAL FIELD

The present invention relates to a method for producing a multicomponent extrudate, and more particularly to a method for producing a multicomponent extrudate using an extrudate operating line which automatically and accurately extrudes the amount of each extrudate material necessary to obtain specified dimensions in the multicomponent extrudate.

BACKGROUND OF THE INVENTION

As trends in the tire industry continue toward the use of layered or multicomponent extrudates, the methods for adjusting the extruders used to manufacture multicomponent extrudates is becoming increasingly important. Multiple cold pin feed extruders are typically used to manufacture such extrudates. Since each of the extruders operates at its own screw speed, each extruder must be individually adjusted to contribute the desired amount of each material to the one-piece multicomponent extrudate or composite profile.

Variations in material temperature and material properties render adjustment of the extruders to predetermined screw speeds based on temperature set points an inadequate means of correction. Where the extruders are inadequately adjusted, expensive extrudate material must often be discarded if the extrudate is over or under the specified dimensions of the profile. Additionally, operators must spend valuable time repeating manufacture of the extrudate to obtain a composite profile having the desired dimensions.

One example of a method used to make extruder adjustments is provided in U.K. Patent No. 2,141,844 (which corresponds to U.S. Pat. No. 4,515,738). Pneumatic or ultrasonic spacing measurement devices are used to measure the spacing between the extruded composite profile and the devices. The measured space between the devices and the extrudate is then compared with the desired and expected space. In the event the measured space differs from the desired value, the speed of one of the extruders is adjusted until the measured and desired values are equal.

In another patent, U.K. Patent No. 2,166,568, the operating pressures and temperatures of the individual extruders used to produce the composite extrudate are measured. Upon exiting the extruder, the extrudate is weighed to obtain its actual weight per unit length. The measured weight is then compared with the desired weight per unit length of an extrudate which has the specified dimensions. In the event the actual weight differs from the desired weight, the measured pressures and temperatures are compared to the desired pressure and temperature values for the extruders. Where the measured pressures and temperatures differ from their desired values, they are adjusted, such that the actual weight per unit length of the composite extrudate is adjusted to the desired value.

Unfortunately, such pressure and temperature adjustment methods are not believed to be reliable, since the pressure and temperature measurements relied upon also include changes due to variations in material properties.

SUMMARY OF THE INVENTION

The present invention provides a new and useful method of producing a multicomponent extrudate profile having more accurate dimensions. The present method relates the rotational speed of each extruder screw and the speed of the take-away line with the measured dimensions of the multicomponent extrudate profile at locations where the relative contributions to the measurement from the output of each extruder are distinctly different from each other. The number of such measurements is equal to or greater than the number of extruders.

Using the preferred embodiment of the present method to automatically adjust the extrusion of a triplex extrudate profile, the thickness of the extrudate profile is measured at three locations across its width, the width of the extrudate profile is measured, as are the screw speeds of each extruder and the line speed of the take-away device used to remove the extrudate from the extruders. A digital computer may also be used for data acquisition and calculation of screw speeds based upon the dimensional values using experimentally determined constants characteristic of the extruders and the die.

Upon providing the measured thicknesses and width of the triplex extrudate profile, the computer calculates the corresponding extruder screw speed-to-line speed ratios. The computer also uses the specified thicknesses and width of the extrudate to calculate the corresponding extruder screw-to-line speed ratios in the same manner. Upon comparison of the predicted screw-to-line speed ratio of each extruder based on measured dimensions with the predicted screw-to-line speed ratio based on the ratio of each extruder may then be adjusted by the difference between these values. Alternatively, the extrudate weight per unit length may be substituted for a measured dimension for comparison with a specified dimension in the above procedure. Using the present method, the screw speed of each extruder may thus be determined and adjusted to obtain an extrudate of specified dimensions.

In another embodiment of the present method, in order to automatically adjust the extrusion of a duplex extrudate profile, overall dimensional measurements and radiation transmission measurements are made at the same locations on the extrudate profile. Transmission measurements must be coupled with overall dimensional measurements at the same location to allow determination of the contribution to the overall dimension from each extruder. Measurements must be made at locations where the relative output contributions of the extruders are distinctly different from each other. The screw speeds of each extruder and the line speed of the take-away device used to remove the extrudate from the extruders are also measured. The digital computer collects the measured dimensions and transmission values. The data base in a computer includes experimentally determined constants dependent on the operating conditions of the extruders, together with the mass absorption coefficients of the materials being extruded.

Upon providing the actual measured thicknesses and transmission values for the duplex extrudate profile, the computer calculates the individual thicknesses of the materials within the extrudate profile, which are then used to calculate the corresponding extruder screw-to-line speed ratios. The computer then uses the specified individual thicknesses of the materials for the desired extrudate to calculate the corresponding extruder screw-to-line speed ratio. The present method can be used to control multiple extruders provided that the total number of measurements equals or exceeds the number of extruders to be controlled.

Upon comparison of the predicted screw-to-line speed ratio of each extruder based on measured dimensions with the predicted screw-to-line speed ratio based on specified dimensions, the screw speed of each extruder may then be adjusted by the difference between these values or some fraction thereof. Using the present method, the desired screw speed of each extruder may thus be determined and adjusted accordingly.

In either of the preferred embodiments, adjustment of each extruder to its new screw speed by the amount of any adjustment increment may be made by conventional electromechanical devices, upon receiving signals from the computer. Alternatively, extruder adjustments may be made manually by a skilled operator. By adjusting the screw speeds of each extruder as needed, the amount of each extrudate material necessary to achieve the desired multicomponent extrudate profile is contributed.

As the calculations performed by the computer upon receiving the actual extrudate profile measurements are extremely rapid, the comparison of actual measurements to desired measurements to obtain the adjustment increment, may be performed continuously, or at any interval the operator may select.

The further features of the present invention will become apparent from the following detailed description and the accompanying drawings.

BRIEF DESCRIPTION OF DRAWINGS

FIG. 3 is a schematic view of an operating line for manufacturing a multicomponent extrudate using another preferred embodiment of the present invention.

FIG. 4 shows a schematic cross-sectional view of a duplex extrusion profile.

DETAILED DESCRIPTION OF THE PREFERRED EMBODIMENTS

Figures 1, 2:
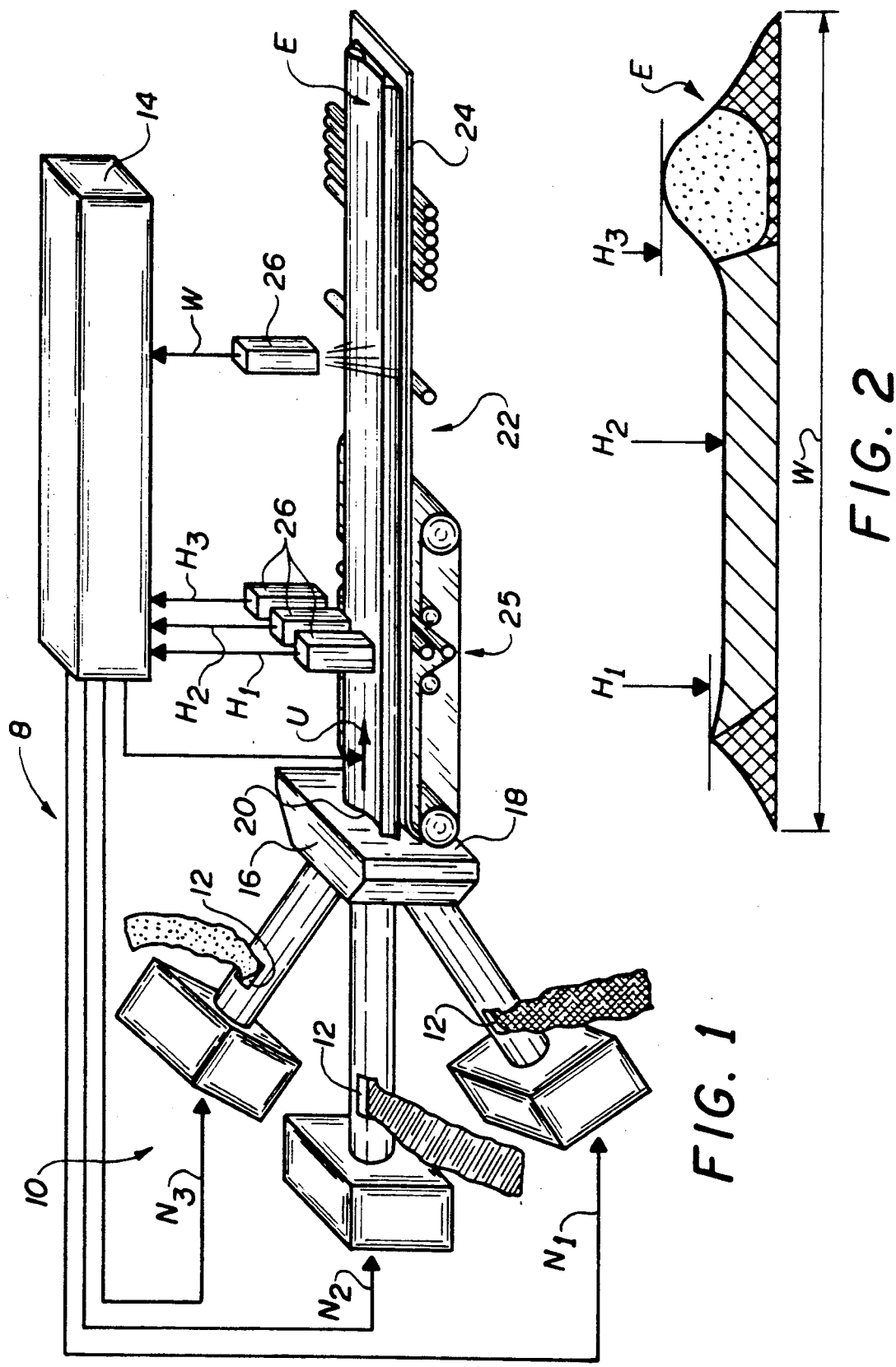
FIG. 1 is a schematic view of an operating line for manufacturing a multicomponent extrudate using the method of the present invention.
FIG. 2 shows a schematic cross-sectional view of a triplex extrusion profile.

FIG. 1 schematically represents an operating line for manufacturing a multicomponent extrudate. The operating line 8 includes cold feed extrusion devices adapted for use in the present invention. These devices include extruders 10 having receiving hoppers 12 into which raw material to be extruded is placed. Each extruder has an internal screw (not illustrated) which turns at an individual screw speed by means of a system speed controller 14. In the preferred embodiments the extruders used were manufactured by Monsanto Company and Paul Troester Maschienfabrik.

Each extruder heats and mixes the material to be extruded and transports the material to a head 16. The head 16 is positioned behind a die 18, and extrudate material is forced through an opening 20 in the die pursuant to rotation of the internal screw. Extrusion of the material through the die head opening 20 produces a continuous extrudate E having a profile corresponding to the die head opening.

The extrudate E is removed from the die 18 via a take-away device 22. As schematically illustrated in FIG. 1, the take-away device includes a conveyor belt 24 having a continuous belt drive 25. The take-away device 22 operates at a line speed which may be adjusted using the system speed controller 14.

In the embodiment of the present method illustrated in FIG. 1, a triplex extrusion profile E may be adjusted using the measurements of the profile, including the thickness of the extrudate profile at three locations $H_1$, $H_2$, $H_3$ across its width, preferably the peak thicknesses as illustrated in FIG. 2. The width of the extrudate profile W, the screw speeds of each extruder $N_1$, $N_2$, $N_3$, and the line speed U of the take-away device used to remove the extrudate from the extruders, are also measured for use in adjustment of the profile measurements.

The devices used to measure the peak dimensions, including the thicknesses and width of the extrusion profile, include a plurality of sensors 26. Each sensor 26 is positioned along the take-away device 22 to measure a thickness or width of the extrudate. The preferred sensor for measuring the thicknesses of the extrudate is a pneumatic, non-contacting, linear variable differential transformer, of the type manufactured by Schaevitz Company of Pennsauken, N.J., under Model No. PPD-125. Using sensors of this type, measurements are made using a pneumatic servo mechanism which positions a follower (not illustrated) immediately adjacent, but not in contact, with the extrudate surface. Each sensor 26 is coupled to a movable member of the follower to provide stepless linear, electrical output, proportional to the thickness of the extrudate moving along the take-away device. Such sensors measure the extrusion thickness to within 1 mil. It is understood that additional sensors known in the art may also be used, for example, laser devices.

The measurement outputs of the sensors 26 are supplied to the system speed controller 14, as schematically illustrated in FIG. 1. The controller, which is preferably a digital computer, collects, calculates and compares quantities based on measured values with quantities based on specified values supplied to the controller. The data base includes experimentally determined constants which are dependent upon the operating variables of the extruders, such as screw temperature or geometry, and which are determined as discussed below.

Upon collection of the thickness ($H_1$, $H_2$ and $H_3$) and width (W) measurements, the actual measurements are used to determine the corresponding screw speed (N) to line speed (U) ratio (N/U) for each extruder according to the following equation:

$$N_i/U = \sum_{j=1}^{P} C_{ij} X_j^{1/n_j}$$

In this equation:

$N_i$ is a screw speed of for the ith extruder;

U is the line speed of the take-away device used to remove the extrudate from the extruders;

$N_i/U$ is the ratio of the screw speed to the line speed;

P is the number of measured dimensions;

$X_j$ is any one of the thickness or width dimensions measured at the jth location; and $C_{ij}$ and $n_j$ are the experimentally determined constants.

Using the above-mentioned equation, the measurement-based screw-to-line speed ratio $(N_i/U)^m$ is calculated using measured dimensions. The specification-based screw-to-line speed ratio $(N_i/U)^s$ is then calculated using the same equation and the desired specified thicknesses and width of the extrudate. The ratios based upon measured and specified dimensions are then used to calculate the difference predicted to bring the extrudate into specification. In the event less than 100% of the predicted change is desired to be made, a fractional gain increment $\alpha$ can be used to calculate an updated $(N_i/U)^u$ value which differs from the prior actual $(N_i/U)^a$ value by less than the calculated difference, according to the equation:

$$(N_i/U)^u = (N_i/U)^a + \alpha[(N_i/U)^s - (N_i/U)^m]$$

The actual screw speeds $(N_i)^a$ of each extruder may then be adjusted to the updated value by the controller 14 based upon the comparison difference, or gain increment multiple thereof, between the predicted screw speeds based on measured and specified values. The adjustment of each extruder to its new screw speed is preferably made by conventional electromechanical devices upon receiving signals from the controller 14. Alternatively, extruder adjustments may be made manually by a skilled operator.

The experimental constants $(C_{ij}, n_j)$ used by the controller to determine the desired screw-to-line speed ratios may be experimentally determined by extrusion of a triplex profile having, for example, four measured dimensions $(H_1, H_2, H_3$ and $W)$, and three known screw speeds $(N_1, N_2, N_3)$, using an operating line 8 as shown in FIG. 1.

First, a dimension $X_j$ is measured at location j, which dimension typically has a contribution from each extruder i operated at screw-to-line speed ratio $N_i/U$. This contribution will typically be nonlinear, since the ratio $N_i/U$ is proportional to the cross-sectional area of the extrudate which is locally related to extrudate thickness times width. A model in which $N_i/U$ values are considered proportional to the dimension $X_j$ raised to an exponent $1/n_j$ relates the dimension to the screw-to-line speed ratio. Therefore:

$$X_j^{1/n_j} = \sum_{i=1}^{M} K_{ji}(N_i/U)$$

where M is the number of extruders and the $K_{ji}$ are experimentally determined constants.

As an example of the experiment used to calculate the constants $K_{ji}$ and $n_j$, a triplex extrudate may be extruded wherein measurements of the thickness and width $(H_1, H_2, H_3, W)$ are made, and the screw-to-line speed ratios $(N_1/U, N_2/U, N_3/U)$ for the three extruders are all changed by the same fixed ratio. By using these settings and measurements and ratioing the results, constants $K_{ji}$ may be factored out, and the values of $1/n_1, 1/n_2, 1/n_3$ and $1/n_4$ may then be calculated directly using the experimental output data. The calculation of the values of $K_{ji}$ may then be made using the values $1/n_1, 1/n_2, 1/n_3$ and $1/n_4$ and a regression analysis, which is conducted to fit the experimental data output to the equations to obtain the $K_{ji}$'s. The $C_{ij}$ values are then obtained from the $K_{ji}$'s using standard matrix inversion techniques, which are known to one of ordinary skill in the art. In one example experiment wherein the values for constant n were determined for thickness and width measurements, the n values were approximately 0.65 and 0.34, respectively. An example of the $K_{ji}$ values determined by the linear least square fit regression are set forth in Table 1.

TABLE 1

$H_1^{1.6091} = 4666 (N_1/U) + 1418 (N_2/U)$
$H_2^{1.1890} = 79.2 (N_1/U) + 270.0 (N_2/U)$
$H_3^{2.2837} = 166146 (N_1/U) - 68922 (N_2/U) + 655941 (N_3/U)$
$W^{3.1103} = 1363 (N_1/U) + 3060 (N_2/U) + 1092 (N_3/U)$ where H is expressed in mils, W in inches and N/U has units of rpm/(ft/min) or rev/ft.

In a second preferred embodiment of the present method, the extrusion of a duplex extrudate profile, E' in FIG. 4, is automatically adjusted. As the elements of the operating line of the second embodiment are substantially similar to that referred above, the reference numerals used will be the same with the addition of a prime designation. To automatically adjust the operating line 8' extruding the duplex extrudate profile E', one or more overall dimensions of the extrudate profile are measured. At the same measurement location a transmission measurement is also taken to determine the overall transmission absorption levels of the materials within the extrudate profile. In the preferred embodiment described, an x-ray transmission measurement using an x-ray measuring device 40 was preferably used, however, it should be understood by one of ordinary skill in the art that beta, gamma, infrared or other transmission absorption, backscatter, interferometric, or acoustic measurements may be used.

Using the digital computer of the system controller 14', overall dimensions and intensity transmission measurements are collected and communicated to the system controller. Using known mass absorption coefficients $(\mu/\rho)$ for the materials being extruded, which are provided to a computer data base of the system controller, the thickness of a material (1 or 2) in the extrudate at the measurement location is calculated using the incident beam intensity $(I_o)$ and the material's transmitted intensity (I) measured from the transmission device 40, according to the following equation:

$$H_1 = \frac{\ln(I/I_o) + (\mu/\rho)_2 H}{(\mu/\rho)_2 - (\mu/\rho)_1}$$

where $H_1$ is the thickness of material 1, H is the overall thickness, and the subscripts 1 and 2 refer generally to the coefficients of materials 1 and 2, respectively. The mass absorption coefficients for each of the materials being extruded, and the individual components thereof, are set forth, for example, in Alexander, L. E., *X-Ray Diffraction Methods in Polymer Science*, Wiley-Interscience, New York (1969).

Upon providing the actual measured thicknesses and transmission absorption intensities of the duplex extrudate profile E', the system controller 14' calculates the individual thicknesses of the materials, using the above equation, and assuming $H_1 + H_2 = H$ within the extrudate profile. Once the actual measured values of $H_1$ and $H_2$ have been determined, the computer then uses these values and specified dimensions to calculate the desired extruder screw speeds in the same manner described above, but with different constants.

The preferred methods of producing a multicomponent extrudate using an extrudate operating line which automatically and accurately extrudes the amount of each extrudate material necessary to obtain the specified dimensions in the multicomponent extrudate has been described above. However, with the present disclosure in mind, it is believed that obvious alternatives to the preferred embodiment to achieve comparable features and advantages in other extrusion operating lines will become apparent to those of ordinary skill in the art.

We claim:

1. A method for controlling production of a multicomponent extrudate profile using an extrusion line having multiple extruders, means for varying the screw speed of each extruder, a take-away device for removing extrudate from the extrusion line at a line speed, and a digital computer, the method comprising the steps of:

providing said computer with a data base including at least, specified dimensional measurements of a multicomponent extrudate for specified measurement locations, initial actual screw speeds of each of the multiple extruders, an initial actual line speed of the take-away device, a set of constants which are characteristic of the particular multiple extruders, the particular specified measurement locations, the particular die and method of measurement that are being used, measuring a number of external dimensions of the extrudate at least equal to the number of multiple extruders and at measurement locations where relative contributions to said extrudate from each of said multiple extruders is distinctly different;

providing said computer data base with said measured external dimensions;

determining in the computer using said data base containing said measured external dimensions and constants, a measured screw-to-line speed ratio for each extruder based on said measured external dimensions;

determining in the computer using said data base, a specified screw-to-line speed ratio for each extruder based on said specified dimensional measurements;

determining in the computer screw speed adjustment increments by substracting said measurement-based screw-to-line speed ratio for each extruder from the specification-based screw-to-line speed ratio for each extruder; and adjusting the actual screw speed of each extruder by said screw speed adjustment increment.

2. The method of claim 1, wherein the step of measuring the external dimensions of the multicomponent extrudate exiting the operating line includes measuring the thickness or width of the extrudate to determine the contribution of each material within the multicomponent extrudate profile.

3. The method of claim 1, wherein the step of measuring the multicomponent extrudate exiting the operating line additionally includes a step of measuring the weight per unit length of the extrudate or radiation transmission through the extrudate, at said measurement locations on the extrudate, to determine contributions of each material within the multicomponent extrudate profile.

4. The method of claim 3, wherein the step of providing said computer with a data base additionally includes providing the computer data base with absorption coefficients of the materials within the multicomponent extrudate profile.

5. The method of claim 2 or 3, wherein the step of measuring the external dimensions of the multicomponent extrudate exiting the operating line, includes measuring the overall thickness of the extrudate at various locations across its width, and the width of the extrudate, at the same locations.

6. The method of claim 5, wherein the step of providing said constants includes measuring external dimensions of said multicomponent extrudate profile at particular locations for fixed screw-to-line-speed ratios, using a regression analysis to relate external dimensions to said fixed screw-to-line speed ratios, and calculating the inverse of said relation to determine said constants which relate said screw-to-line speed ratios to said measured external dimensions.

7. The method of claim 1, wherein the step of providing said constants includes using dimensions of extrudate resulting from a particular extruder at particular locations for fixed and specified screw-to-line speed ratios, using a regression analysis to relate said dimensions to said fixed screw-to-line speed ratios, and calculating the inverse of said relation to determine said constants which relate said screw-to-line speed ratios to said dimensions.

8. A method for producing a multicomponent extrudate using an extrusion line having multiple extruders, means for varying the screw speed of each extruder, a take-away device for removing extrudate from the extension line at a line speed, and a digital computer, the method comprising the steps of:

providing said computer with a data base including at least, specified dimensional measurements of a multicomponent extrudate for specified measurement locations, initial actual screw speeds of each of the multiple extruders, an initial actual line speed of the take-away device, providing said computer data base with a set of constants characteristic of the particular multiple extruders, the particular specified measurement locations, the particular die and method of measurement that are being used, by measuring external dimensions of said multicomponent extrudate profile at particular locations for fixed screw-to-line-speed ratios, using a regression analysis to relate external dimensions to said fixed screw-to-line speed ratios, and calculating the inverse of said relation to determine said constants which relate said screw-to-line speed ratios to said measured external dimensions;

measuring a number of external dimensions of the extrudate, wherein said external dimensions comprise the thickness or width of the extrudate, to determine the contribution of each material within the multicomponent extrudate profile, said number of external dimensions being at least equal to the number of multiple extruders and measured at a measurement location where relative contributions to said extrudate from each of said multiple extruders is distinctly different;

providing said computer data base with said measured external dimensions;

determining in the computer using said data base containing said measured external dimensions and constants, a measured screw-to-line speed ratio for each extruder based on said measured external dimensions;

determining in the computer using said data base, a specified screw-to-line speed ratio for each extruder based on said specified dimensional measurements;

determining in the computer screw speed adjustment increments by subtracting said measurement-based screw-to-line speed ratio for each extruder from the specification-based screw-to-line speed ratio for each extruder; and adjusting the actual screw speed of each extruder by said screw speed adjustment increase.

9. The method of claim 8, wherein the step of measuring the multicomponent extrudate exiting the operating line additionally includes measuring the weight per unit length of the extrudate.

* * * * *

UNITED STATES PATENT AND TRADEMARK OFFICE
CERTIFICATE OF CORRECTION

PATENT NO. : 5,128,077

DATED : July 7, 1992

INVENTOR(S) : James F. Stevenson, Thomas E. Codispoti

It is certified that error appears in the above-identified patent and that said Letters Patent is hereby corrected as shown below:

Col. 10, line 4 please delete "increase" insert therefore --increment--

Signed and Sealed this

Third Day of August, 1993

Attest:

MICHAEL K. KIRK

Attesting Officer

Acting Commissioner of Patents and Trademarks